May 13, 1924.
H. W. BROMLEY
1,494,212
ADJUSTABLE CLAMP FOR BOOKRESTS OR THE LIKE
Filed Dec. 5 1922   2 Sheets-Sheet 1
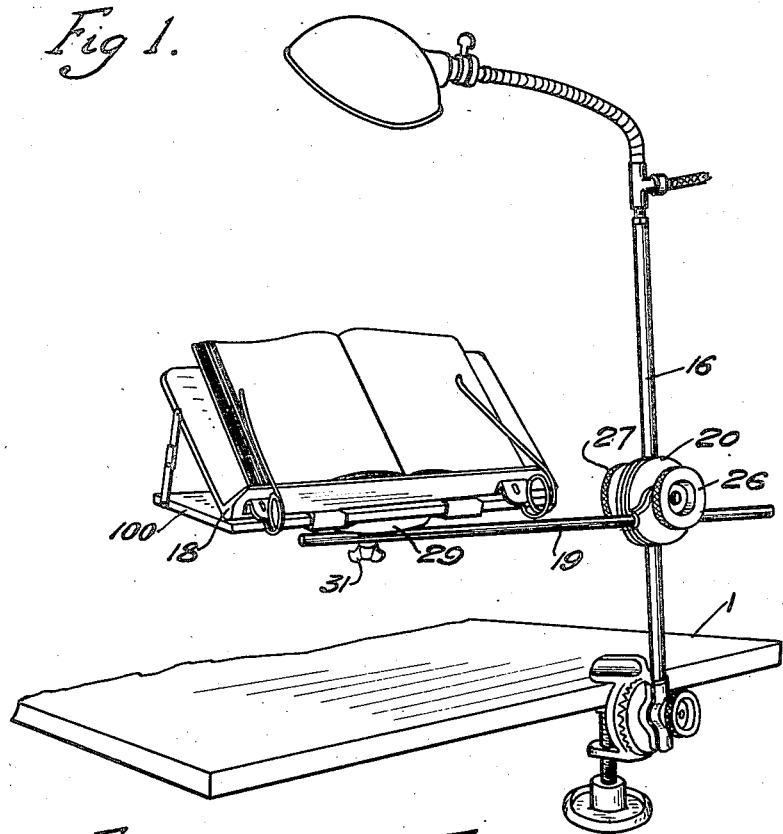
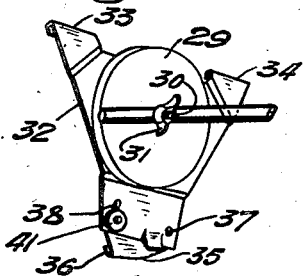
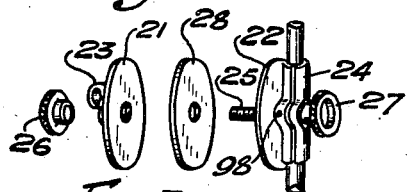
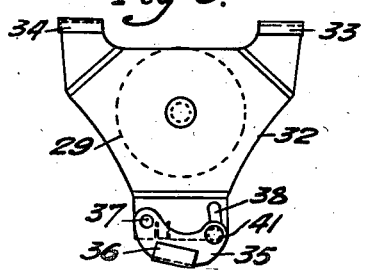
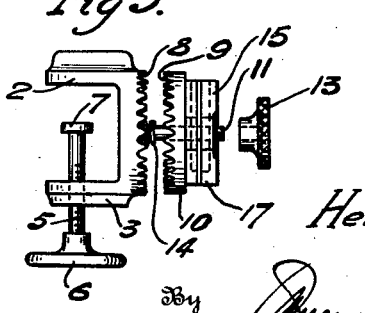
Inventor
Henry W. Bromley
By
Attorney May 13, 1924.

H. W. BROMLEY 1,494,212

ADJUSTABLE CLAMP FOR BOOKRESTS OR THE LIKE

Filed Dec. 5, 1922  2 Sheets-Sheet 2

Inventor
Henry W. Bromley
By
Attorney

Patented May 13, 1924.

1,494,212

UNITED STATES PATENT OFFICE.

HENRY W. BROMLEY, OF CYNTHIANA, KENTUCKY.

ADJUSTABLE CLAMP FOR BOOKRESTS OR THE LIKE.

Application filed December 5, 1922. Serial No. 605,053.

*To all whom it may concern:*

Be it known that I, HENRY W. BROMLEY, a citizen of the United States, residing at Cynthiana, in the county of Harrison and State of Kentucky, have invented certain new and useful Improvements in Adjustable Clamps for Bookrests or the like, of which the following is a specification.

This invention relates to adjustable clamps for book rests or the like and has for its principal object the construction of a novel clamp for adjustably positioning the supporting elements of the book rest, and for securing the latter to its base of support.

More broadly the object of the invention is to construct a clamp for adjustably holding a plurality of elements against relative translatory movement, relative angular rotation, and axial rotation in such manner that one of said movements may be performed without executing the others.

Another object of the invention is the provision of a clamp for adjustably holding two elements against relative translatory movement, relative angular rotation and axial rotation, said clamp functioning when loosened to release its control upon the translatory and axial movements of said elements prior to the slackening of its influence upon their relative angular rotative movement, and, when tightened, acquiring control of the movements of said elements in the reverse order.

Another object of the invention is to provide a clamp including a rotary friction joint and a split resilient sleeve in association therewith, with means for putting said sleeve under clamping tension, said sleeve while tensioned functioning to maintain the frictional resistance which normally inhibits movement of said friction joint.

A further object of the invention lies in the provision of a book rest or similar support, the adjustable parts of which are held together by clamps in which a single part performs several functions of adjustment, so that said part may be manipulated to perform one adjustment without necessarily impairing the stability of the other adjustments.

A still further object of the invention is the provision of a novel shelf-securing spider by means of which the shelf, tray or other final element of my improved support is secured thereto.

With the above and other objects in view, my invention consists in the improved adjustable clamp for book rests or the like illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 1 is a perspective view of the improved support showing the book rest attached thereto.

Figure 2 is an exposed view of the upper joint.

Figure 3 is a similar view of the supporting joint.

Figure 4 is a perspective view of the beneath side of the shelf securing spider.

Figure 5 is a beneath plan view of the same.

Figure 6:
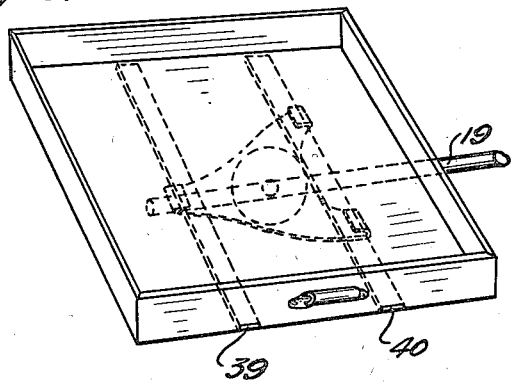
Figures 6, 7 and 8 are perspective views of a serving tray, music rack and copy holder, with means for interchangeably attaching them to my improved support.

Referring now in detail to the several figures the numeral 1 represents a supporting means which may be of any nature whatsoever but in practice is likely to be a portion of a chair, table, bed rail or other piece of household furniture. To this is secured the supporting clamp of the book rest which preferably comprises spaced fixed jaws 2 and 3 one of which is provided with a threaded aperture through which extends a threaded stem 5 having a hand wheel at its lower end. The stem 5 is furnished inwardly with a bearing piece 7 between which and the inner face of the jaw 2, the supporting means 1 is clamped. A vertical face of the supporting clamp is preferably provided with an annular series of serrated teeth 8 which is adapted to register with a similar series of teeth 9 carried by the proximate face of the relative movable member 10. Said member is furnished with a central bore through which passes a pin 11 which projects integrally from the stationary element of the supporting clamp centrally of the series of projections 8. The member 10 is loosely mounted upon the pin 11 and is urged longitudinally thereof by means of a hand wheel 13 which makes threaded engagement with the outer end of the pin 11.

A spring 14 surrounds the portion of the pin 11 intermediate the opposing series of teeth and normally throws said teeth out of interengagement when the hand wheel 13 is sufficiently loosened.

The member 10 is provided also with a resilient split socket 15 having a bore which is adapted to loosely support the vertical rod 16, shown in Figure 1, when said sleeve is in fully expanded position. Said sleeve is furnished at its lower end with a shoulder 17 to prevent the rod 16 from sliding below the lower end thereof and affording an end thrust bearing for said rod when the latter is rotated. When the hand wheel 13 is first tightened against the split socket its initial action will be to put said socket under tension without closing it so that said socket itself acts as a spring in forcing the series of teeth 8 and 9 into engagement. When said teeth are firmly engaged so that they can no longer move toward one another, the next action performed by the tightening movement of the hand wheel 13 is to close the split socket 15 clampably against the rod 16 holding it against axial rotation. When the hand wheel 13 is loosened it will first expand the split socket enabling the rod 16 to be freely rotated, the series of teeth 8 and 9 being meanwhile held in engagement by the resiliency of said socket, acting against the hand wheel on one side and through the member 10 on the other. it is apparent that rotary adjustment of the book rest about a vertical axis may thus be accomplished without disturbing the vertical stability of the rod 16. When it is desired to position said rod obliquely it is necessary to loosen the hand wheel sufficiently to enable the spring 14 to throw the series of teeth 8 and 9 out of engagement.

The book rest 18 is carried by a transverse rod 19 which is adjustably supported by the rod 16 through the upper clamp 20. This clamp comprises the parts shown in Figure 2 in which 21 and 22 represent oppositely facing friction plates having upon the outer faces thereof the split sleeves 23 and 24. These sleeves are precisely similar to the socket 15 hereinbefore described except that there is no shoulder 17, the bores of said sleeves being of uniform diameter throughout and permitting relative sliding movement of supporting rods therethrough.

The sleeve 24 surrounds the vertical rod 16 while the horizontal sleeve 23 embraces the horizontal rod 19. A stem 25 passes through central apertures in both friction plates, being secured to the sleeve 24 by a pin 98 passed transversely therethrough. The stem 25 is threaded at its opposite ends for the reception of the hand wheels 26 and 27 respectively. It is preferable to have a friction member which is here indicated as a leather or fiber washer 28, interposed between the faces of the friction plates 21 and 22 although if desired the abutting faces of said plates may be so formed or treated as in themselves to possess the required coeffiecient of friction. Both of the hand wheels 26 and 27 function in their relation to the sleeves 23 and 24 and the friction plates in precisely the same manner as does the hand wheel 13 with respect to the split sleeve 15 and the series of teeth 8 and 9. That is, when the wheel 27 is loosened the split sleeve 24 will be expanded to permit the book rest to be adjusted in a height direction, the frictional hold of the plate 22 against the washer 28 being unimpaired. Should it be desired to angularly adjust the position of the rod 19 in a vertical plane, to tilt the book shelf, music holder or other devices hereinbefore mentioned toward the person using the invention, it may be done by forcibly overcoming the friction between the friction plates without manipulation of the hand wheel. Should it be desired to alter the distance of the book rest from the rod 16, it is done by loosening the hand wheel 26, extending the sleeve 23 to permit the free sliding of the rod 19 therein while at the same time maintaining the frictional coefficient of the plate 21 with the washer 28.

Figure 7:
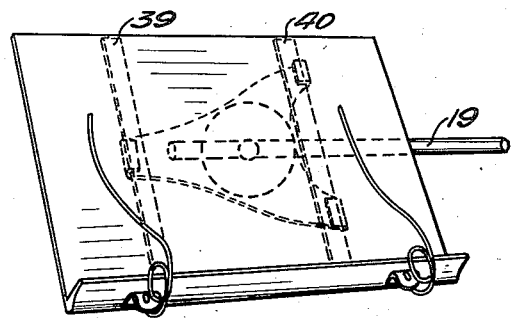
Figure 8:
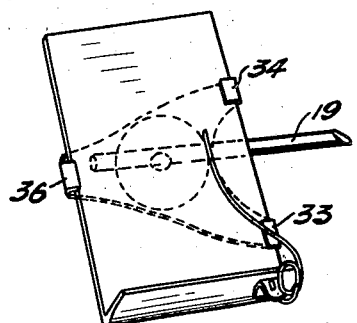

The book rest 18 shown in Figure 1 is only one of a number of devices which may be interchangeably secured in operative relation to my improved support. Other devices included in this number are shown in the Figures 6, 7 and 8 the first being a serving tray, the second a music rack and the last a typist's copy holder, and these are suggestive of other devices which it is not necessary here to mention. The means for securing the book rest 18 to the rod 19 consists of a turntable 29 which is secured by a pin 30 attached to the lower side thereof and passing through an aperture in the end of the rod 19, being firmly held by means of a thumb nut 31. The turntable, as here shown includes a spider 32, two of the arms of which are provided with aligned fixed cleats 33 and 34, the third arm being furnished with an adjustable cleat 35. The latter comprises a member having a channeled edge 36 pivotally supported at 37 and adjustably secured to the spider 32 at its other end by means of a pin and slot connection 38. The cleats of the spider grip the opposite edges of the shelf 100 of the book rest. Devices having wider shelves as the serving tray and music rack such as shown in Figures 6 and 7 are made interchangeable with the rest by means of spaced bars 39 and 40 firmly secured thereto and adapted to be engaged by the cleats of the spider 32. The two aligned cleats are adapted first to be extended over the edge of one of the bars and the cleat 35 to be brought as near to parallelism as possible, in engagement with the other bar, the thumb nut 41 of the pin and slot connection being then tightened to hold the cleat in position.

By means of the turn table 29 the book rest or other attached device may be rotated angularly with respect to the horizontal rod 19 to any desired degree while the provision of the adjustable cleats upon the spider 32 permits the ready attachment or removal of one of the devices and the substitution of another.

Although I have thus described the preferred embodiment of my invention, it is evident to those skilled in the arts to which this relates that I may make various changes in the construction, combination and arrangement of the several parts without departing from the spirit and scope of the invention.

Having described my invention what I claim as new and desire to secure by Letters Patent is:—

1. Adjustable supporting means for a book rest or the like, comprising a pair of rods capable of relative translatory, axial, and angular movements, a threaded stem, a split sleeve fixedly associated with said stem and embracing one of said rods, means threadedly engaging said stem for clamping said sleeve to said rod, a friction clutch element fixed relatively to said stem, a second split sleeve for embracing the other of said rods, including a friction clutch element engageable with said fixed clutch element, and means threadedly advanceable upon said stem for imparting tension to said sleeve, normally forcibly maintaining said friction clutch elements in contact, and, in the final stage only of the tensioning movement, clamping said sleeve upon said rod.

2. Adjustable supporting means for a book rest or the like, comprising a pair of rods capable of relative translatory, axial, and angular movement, a threaded stem, a split sleeve fixedly associated with said stem and embracing one of said rods, means threadedly engaging said stem for clamping said sleeve to said rod, a friction clutch element fixed relatively to said stem, a second split sleeve for embracing the other of said rods, including a friction clutch element engageable with said fixed clutch element, and means threadedly advanceable upon said stem for imparting tension to said sleeve, normally forcibly maintaining said frictional clutch elements in contact, and, in the final stage only of the tensioning movement, clamping said sleeve upon said rod, and an article supporting device carried by one of said rods.

3. An adjustable clamp for book rests or the like comprising a stem, means for supporting said stem, a movable and a fixed friction plate associated with said stem, said movable plate being provided with a resilient split sleeve adapted to clampably embrace an element of the book rest, means engaging said stem and advanceable thereupon into engagement with said socket, tensioning the latter for initially holding the friction plates in contact, and finally clamping said sleeve against the book rest element embraced thereby.

4. A book rest comprising a clamp, cooperating clutch elements associated therewith one being fixed relative thereto and having a pin projecting therefrom, the other clutch element being rotatable about said pin, the movable clutch element being provided with a split socket, a rod selectively rotatably and clampably supported in said socket, means on said pin for tensioning said socket to initially hold said clutch elements together and finally to clamp said socket to said rod, a threaded stem, a fixed sleeve fixedly associated with said stem and embracing said rod, means engaging said stem for clamping said sleeve to said rod, a friction clutch associated with said stem, one element thereof being fixed relative thereto and the other rotatable thereabout, the rotatable frictional clutch element being provided with a resilient split sleeve (a second rod carried by said resilient split sleeve, and means threadedly advanceable upon said stem for imparting tension to said resilient split sleeve for normally forcibly maintaining said frictional clutch elements in contact, and, in the final stage only of said tensioning movement, clamping said sleeve against said second rod, and an article supporting device carried by the second rod.

In testimony whereof I have hereunto set my hand.

HENRY W. BROMLEY